(12) United States Patent
Drake et al.

(10) Patent No.: US 11,300,209 B2
(45) Date of Patent: Apr. 12, 2022

(54) WIRE MESH BRUSH SEAL WINDAGE COVER

(71) Applicant: United Technologies Corporation, Farmington, CT (US)

(72) Inventors: Jeremy Drake, South Berwick, ME (US); Raymond Surace, Newington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 94 days.

(21) Appl. No.: 16/598,168

(22) Filed: Oct. 10, 2019

(65) Prior Publication Data

US 2020/0049256 A1 Feb. 13, 2020

Related U.S. Application Data

(62) Division of application No. 15/092,793, filed on Apr. 7, 2016, now Pat. No. 10,563,771.

(51) Int. Cl.
*F16J 15/3288* (2016.01)
*F01D 11/00* (2006.01)
(Continued)

(52) U.S. Cl.
CPC ......... *F16J 15/3288* (2013.01); *F01D 11/001* (2013.01); *F01D 11/12* (2013.01); *F04D 29/083* (2013.01); *F05D 2220/32* (2013.01); *F05D 2230/233* (2013.01); *F05D 2240/56* (2013.01); *F05D 2300/514* (2013.01); *F05D 2300/613* (2013.01); *F05D 2300/614* (2013.01)

(58) Field of Classification Search
CPC ..... F16J 15/3288; F01D 11/00; F01D 11/001; F01D 11/12; F04D 29/083; F05D 2220/32; F05D 2230/00; F05D 2230/233; F05D 2230/234; F05D 2240/56; F05D 2300/00; F05D 2240/514; F05D 2240/613; F05D 2240/614
USPC .......................................................... 277/355
See application file for complete search history.

(56) References Cited

U.S. PATENT DOCUMENTS 3,020,185 A * 2/1962 Moffitt, Jr. ............ B29C 70/224
428/365
3,033,722 A * 5/1962 Goodloe .................. F16J 15/22
112/417
(Continued)

FOREIGN PATENT DOCUMENTS

DE  19527605 C2  2/1998
GB  2355049 A  12/1999
(Continued)

*Primary Examiner* — Nathan Cumar
(74) *Attorney, Agent, or Firm* — Getz Balich LLC

(57) ABSTRACT

Aspects of the disclosure are directed to a brush seal comprising: a first plate, a wire mesh adjacent the first plate, a bristle pack adjacent the wire mesh, and a second plate adjacent the bristle pack. Aspects of the disclosure are directed to a method comprising: positioning a wire mesh adjacent to a first plate, positioning a bristle pack adjacent to the wire mesh, positioning a second plate adjacent to the bristle pack, applying a toolset to hold the first plate, the wire mesh, the bristle pack, and the second plate in a stack-up, and performing an operation to form a brush seal from the stack-up of the first plate, the wire mesh, the bristle pack, and the second plate.

13 Claims, 7 Drawing Sheets

(51) Int. Cl.
*F01D 11/12* (2006.01)
*F04D 29/08* (2006.01)

(56) References Cited

U.S. PATENT DOCUMENTS

| | | | | |
|---|---|---|---|---|
| 4,093,245 A | * | 6/1978 | Connor | F16J 15/3284 126/285 A |
| RE30,206 E | * | 2/1980 | Ferguson | A46B 3/06 228/159 |
| 4,678,113 A | * | 7/1987 | Bridges | A46D 1/08 228/160 |
| 5,090,710 A | * | 2/1992 | Flower | F16J 15/3288 277/355 |
| 5,181,728 A | * | 1/1993 | Stec | F01D 11/001 277/355 |
| 5,201,530 A | * | 4/1993 | Kelch | F16J 15/3288 277/355 |
| 5,265,412 A | * | 11/1993 | Bagepalli | F23R 3/60 60/800 |
| 5,568,931 A | * | 10/1996 | Tseng | F16J 15/3288 277/355 |
| 5,688,105 A | * | 11/1997 | Hoffelner | F01D 11/02 277/355 |
| 5,794,938 A | * | 8/1998 | Hofner | F16J 15/3288 277/355 |
| 5,927,721 A | * | 7/1999 | Schulze | F16J 15/3288 277/355 |
| 6,077,038 A | * | 6/2000 | Gail | F01D 11/001 415/229 |
| 6,170,831 B1 | * | 1/2001 | Bouchard | F01D 11/005 277/355 |
| 6,250,640 B1 | * | 6/2001 | Wolfe | F16J 15/3288 277/303 |
| 6,302,400 B1 | * | 10/2001 | Werner | F16J 15/3288 277/355 |
| 6,357,672 B1 | * | 3/2002 | Cowan | B64C 15/02 239/265.19 |
| 6,406,027 B1 | * | 6/2002 | Aksit | F16J 15/3288 277/355 |
| 6,431,827 B1 | * | 8/2002 | Wolfe | F01D 11/127 29/888.3 |
| 6,488,471 B1 | * | 12/2002 | Stibich | F04D 29/526 415/173.3 |
| 6,601,853 B2 | * | 8/2003 | Inoue | F16J 15/3288 277/355 |
| 6,695,314 B1 | * | 2/2004 | Gail | F01D 11/001 277/355 |
| 6,913,265 B2 | * | 7/2005 | Datta | F16J 15/3288 277/355 |
| 7,595,451 B2 | * | 9/2009 | Kircanski | F01N 3/2853 174/117 M |
| 7,644,928 B2 | * | 1/2010 | Beichl | F16J 15/3288 277/355 |
| 7,653,993 B2 | * | 2/2010 | Couture | F16J 15/3288 29/464 |
| 8,727,354 B2 | * | 5/2014 | Addis | F16J 15/3288 277/355 |
| 8,864,138 B2 | * | 10/2014 | Dos Santos | F16J 15/3288 277/355 |
| 2003/0160392 A1 | * | 8/2003 | Szymbor | F16J 15/3288 277/355 |
| 2003/0178777 A1 | * | 9/2003 | Szymbor | F16J 15/3288 277/355 |
| 2004/0100030 A1 | * | 5/2004 | Addis | F16J 15/3288 277/355 |
| 2004/0173969 A1 | * | 9/2004 | Smith | A46B 3/02 277/355 |
| 2005/0006851 A1 | * | 1/2005 | Addis | F16J 15/3288 277/355 |
| 2006/0181029 A1 | * | 8/2006 | Addis | F16J 15/002 277/355 |
| 2008/0003099 A1 | * | 1/2008 | Giesler | F01D 25/22 415/170.1 |
| 2008/0136112 A1 | * | 6/2008 | Addis | F16J 15/3288 277/355 |
| 2008/0284107 A1 | * | 11/2008 | Flaherty | C04B 35/10 277/355 |
| 2009/0252599 A1 | * | 10/2009 | Cavagnaro | F02B 37/013 415/119 |
| 2011/0227289 A1 | * | 9/2011 | Stefan | F16J 15/3288 277/355 |
| 2012/0195741 A1 | * | 8/2012 | Sarawate | F01D 11/001 415/170.1 |
| 2012/0326392 A1 | * | 12/2012 | Zheng | F01D 11/001 277/355 |
| 2012/0326393 A1 | * | 12/2012 | Zheng | F16J 15/3288 277/355 |
| 2013/0042456 A1 | * | 2/2013 | Anand | F16J 15/3288 29/428 |
| 2015/0300191 A1 | * | 10/2015 | Morreale | F01D 11/001 415/174.2 |

FOREIGN PATENT DOCUMENTS

WO   2014014426 A3   3/2014
WO   2014158589 A1   10/2014

* cited by examiner

WIRE MESH BRUSH SEAL WINDAGE COVER

This application is a divisional of U.S. patent application Ser. No. 15/092,793 filed Apr. 7, 2016, which is hereby incorporated herein by reference in its entirety.

BACKGROUND

Seals are used in an aircraft engine to isolate a fluid from one or more areas/regions of the engine. For example, seals are used to control various characteristics (e.g., temperature, pressure) within areas/regions of the engine and ensure proper/efficient engine operation and stability. Brush seals are a type of seal that provides fluid isolation in the manner described above. A brush seal may be implemented as a bundle/package of bristles sandwiched between two plates.

The bristles may need to be protected. For example, if the bristles are exposed to an excitation (e.g., windage) a bristle may have a tendency to become loose or even break-away from the bristle pack, in which case the bristle may impact (e.g., clog) a downstream component.

Two types of covers are frequently used to protect the bristles of the brush seal. A first type of cover is a plate cover. Plate covers are bulky, add weight, and present difficulties in terms of the manufacturability of the brush seal. A second type of cover is a sheet metal cover. The sheet metal cover is thin and susceptible to degradation due to handling.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a brush seal comprising: a first plate, a wire mesh adjacent the first plate, a bristle pack adjacent the wire mesh, and a second plate adjacent the bristle pack. In some embodiments, the wire mesh is configured as a windage cover with respect to the bristle pack. In some embodiments, the wire mesh is configured to protect the bristle pack with respect to an airflow associated with an engine. In some embodiments, the airflow includes bleed air from a compressor section of the engine. In some embodiments, the wire mesh includes a metal alloy. In some embodiments, the wire mesh has a first length that is substantially equal to a third length of the bristle pack. In some embodiments, the wire mesh has a first length that is substantially less than a third length of the bristle pack. In some embodiments, the wire mesh has a first length that is greater than a second length of the second plate, and the first length is less than a third length of the bristle pack. In some embodiments, at least one of the bristle pack and the wire mesh includes a ceramic coat.

Aspects of the disclosure are directed to a method comprising: positioning a wire mesh adjacent to a first plate, positioning a bristle pack adjacent to the wire mesh, positioning a second plate adjacent to the bristle pack, applying a toolset to hold the first plate, the wire mesh, the bristle pack, and the second plate in a stack-up, and performing an operation to form a brush seal from the stack-up of the first plate, the wire mesh, the bristle pack, and the second plate. In some embodiments, the operation includes electron beam welding. In some embodiments, the operation includes a welding that projects through at least one of the first plate, the wire mesh, the bristle pack, and the second plate. In some embodiments, the operation includes a welding that is performed along an end of the stack-up. In some embodiments, the end is substantially contiguous in relation to the first plate, the wire mesh, the bristle pack, and the second plate. In some embodiments, the operation is performed in conjunction with the application of the toolset. In some embodiments, the operation includes laser welding. In some embodiments, the operation includes application of a mechanical attachment technique. In some embodiments, the mechanical attachment technique includes crimping

BRIEF DESCRIPTION OF THE DRAWINGS

The present disclosure is illustrated by way of example and not limited in the accompanying drawing figures in which like reference numerals indicate similar elements. The drawing figures are not necessarily drawn to scale unless specifically indicated otherwise.

DETAILED DESCRIPTION

Figure 1:
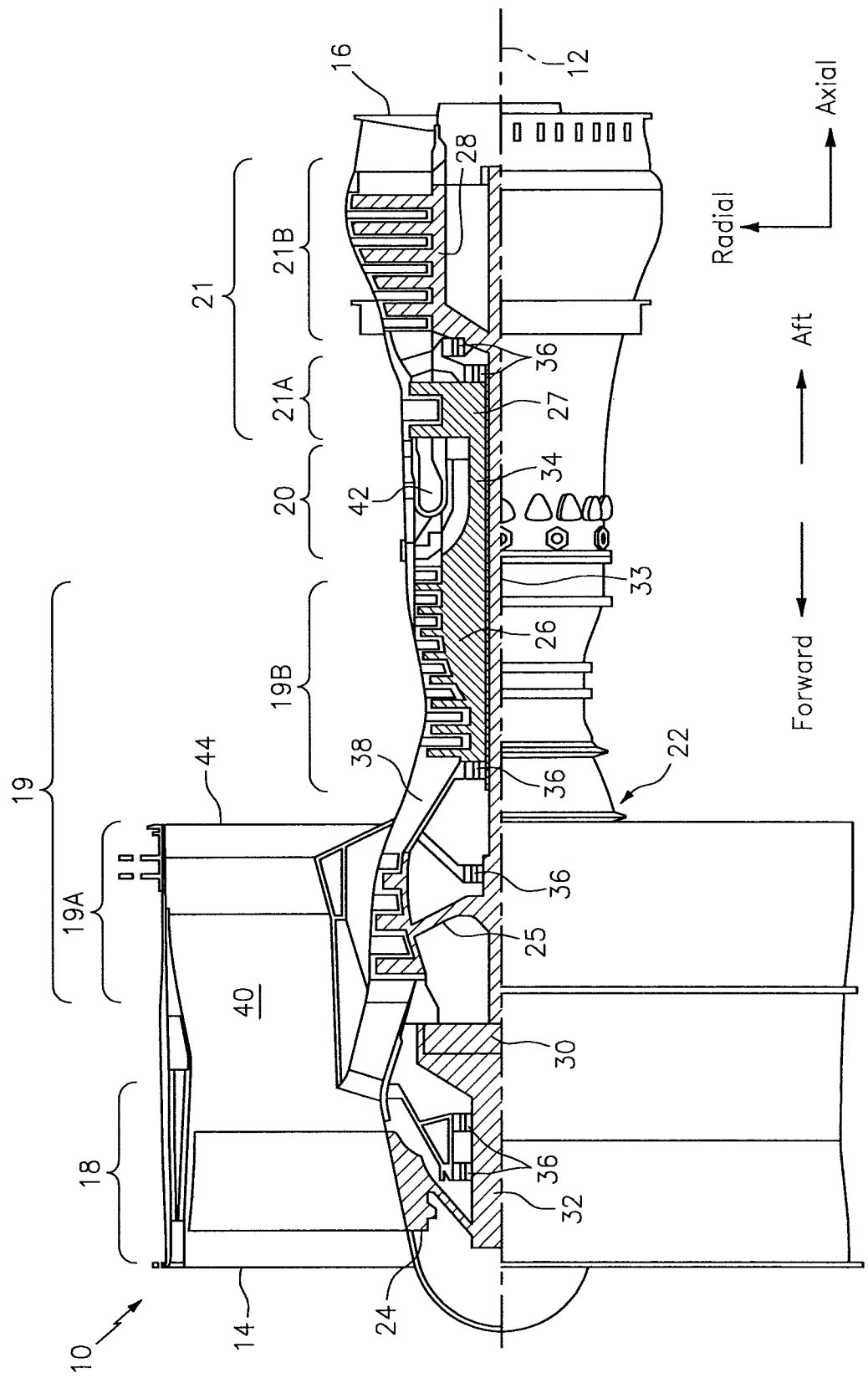
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described in connection with a seal configured for use on an engine. In some embodiments, a brush seal may include a wire mesh windage cover. The wire mesh windage cover may help to protect one or more bristles of a bristle pack.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for a geared gas turbine engine 10. Aspects of the disclosure may be applied in connection with other environments, including additional configurations for gas turbine engines. Aspects of the disclosure may be applied in connection with, e.g., turbojets, turboprops, low bypass ratio gas turbine engines, or high bypass ratio gas turbine engines. In some embodiments, a platform/configuration may utilize multiple flow streams and/or thrust augmentation. Any number of applications incorporating rotating machinery may incorporate aspects of this disclosure. Aspects of the disclosure may be applied in connection with static hardware.

Figure 2A:
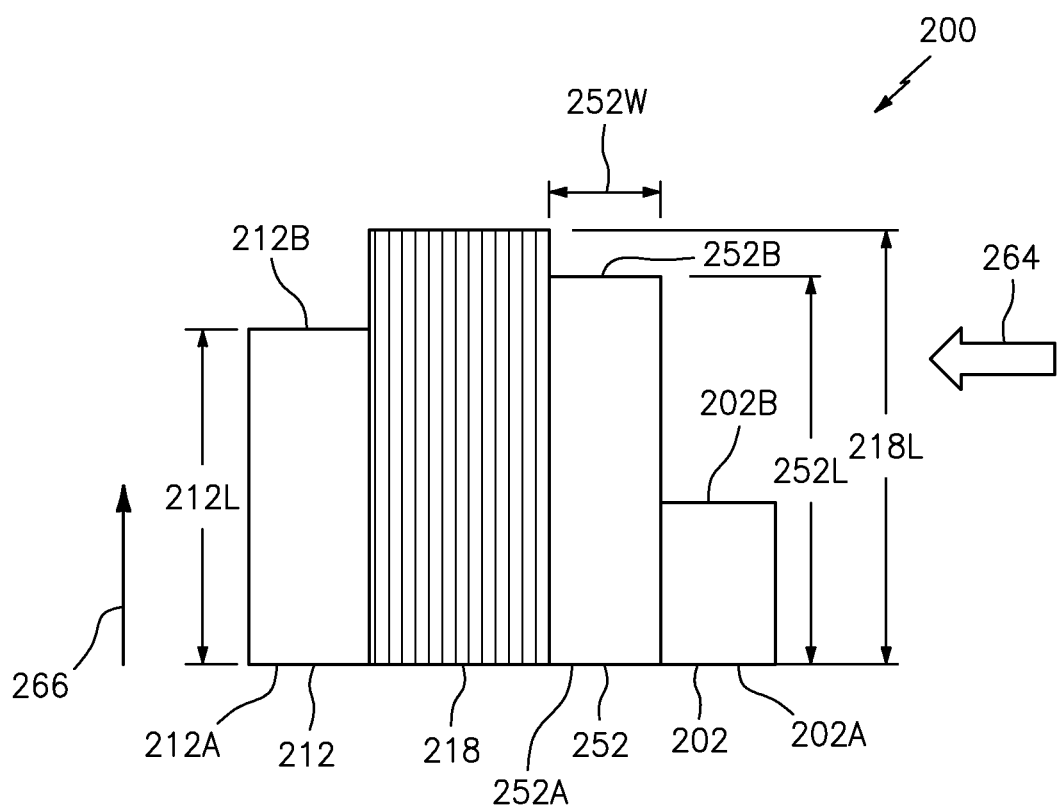
FIG. 2A illustrates a brush seal in accordance with aspects of this disclosure.

Referring now to FIG. 2A, a brush seal 200 is shown. The seal 200 may be incorporated as part of one or more sections of the engine, such as for example the compressor section 19 or the turbine section 21 of the engine 10 of FIG. 1. In some embodiments, the seal 200 may be used to interface a vane or a blade outer air seal (BOAS) of the engine 10. In some embodiments, the seal 200 may be used to interface rotating and static structure (e.g., as part of a pairing of a rotor and stator).

Referring back to FIG. 2A, the seal 200 may include one or more plates, such as for example a top, first plate 202 and a bottom/backing, second plate 212. The plates 202 and 212 may at least partially contain/house a bristle pack 218. The bristle pack 218 may include a plurality of wires/bristles.

The seal 200 may include a wire mesh 252. The wire mesh 252 may be configured as a windage cover with respect to the bristle pack 218 as described further below.

The wire mesh 252 is shown as being disposed between the bristle pack 218 and the plate 202, adjacent to or along a surface of the bristle pack 218. Proceeding in a right-to-left manner in FIG. 2A, the seal 200 may include a stack-up of the plate 202, the wire mesh 252, the bristle pack 218, and the plate 212.

The wire mesh 252 may be coupled to the bristle pack 218 during, e.g., a welding procedure/operation as described further below. The wire mesh 252 may reduce/minimize, or even eliminate, an excitation of the bristles of the bristle pack 218 and provide additional sealing capability. For example, the wire mesh 252 may help to protect the bristle pack 218 against an excitation/flow associated with the reference character/arrow 264 shown in FIG. 2A. The excitation/flow 264 may be indicative of a compressor bleed air or any other secondary airflow (where, for example, a primary airflow may pertain to an airflow involved in combustion within the engine 10 of FIG. 1).

The plate 202, the wire mesh 252, the bristle pack 218, and the plate 212 may be made of one or more materials. For example, a metal alloy may be used in the fabrication/construction of one or more of the plate 202, the wire mesh 252, the bristle pack 218, and the plate 212. The plate 202 or the plate 212 may include Inconel® 625 or Inconel® 718 alloy. The wire mesh 252 may include Inconel® 625.

The wire mesh 252 may have any thickness/width 252W that is suitable for the given application/environment at hand. In connection with use in an aircraft engine, the width 252W may have a value within a range of approximately 0.004 inches (approximately 0.10 millimeters) to approximately 0.060 inches (approximately 1.52 millimeters).

The first plate 202 extends longitudinally in a longitudinal direction 266 from a first plate first end 202A to a first plate second end 202B. The second plate 212 extends longitudinally in the longitudinal direction 266 from a second plate first end 212A to a second plate second end 212B. The wire mesh 252 extends longitudinally in the longitudinal direction 266 from a wire mesh first end 252A, past the first plate second end 202B and the second plate second end 212B, to a wire mesh second end 252B. The wire mesh 252 may have a length 252L. The length 252L may be substantially greater than, or even substantially equal to, a length 212L of the plate 212. The length 252L may be substantially less than, or even substantially equal to, a length 218L of the bristle pack 218. Having the length 252L be less than the length 218L may help to avoid the wire mesh 252 permanently bending in the presence of one or more forces. For example, if the seal 200 is deployed in connection with rotating machinery (e.g., an engine), deformations/imperfections/deflections in a rotor may result in forces that may cause a shaft to come into contract with the bristle pack 218. Providing a clearance/gap between the wire mesh 252 and the bristle pack 218 (illustratively in terms of the difference in their respective lengths 252L and 218L) may aid in preserving the wire mesh 252.

The wire mesh 252 may have any number of candidate densities; the selection of a particular density may be based on the application/environment that the seal 200 is targeted to. A larger density (e.g., a tighter weave of the material used in the fabrication of the wire mesh 252) may make the wire mesh 252 stiffer and provide less flow area through the wire mesh 252.

To provide further environmental protection to the seal 200, one or more portions of the seal 200 may include a coating. For example, the bristle pack 218 and/or the wire mesh 252 may include a ceramic coat, which may enable the seal 200 to operate in environments having elevated temperatures.

Figure 2B:
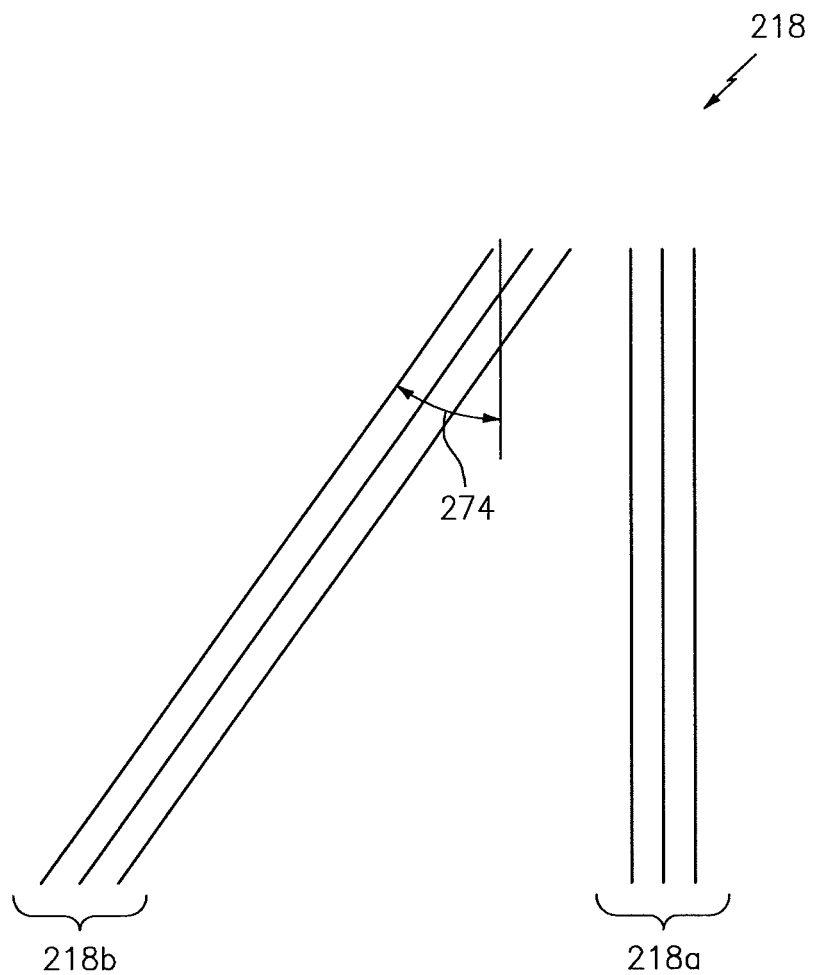
FIG. 2B illustrates an arrangement of bristles within a bristle pack in accordance with aspects of this disclosure.

The bristle pack 218 may include bristles having various types of orientations. For example, and referring to FIG. 2B, the bristle pack 218 is shown as including a first plurality/multiple of bristles 218a and a second plurality/multiple of bristles 218b that are oriented at an angle (denoted by reference character 274) relative to the bristles 218a. The angle 274 may have a value within a range of 30 degrees and 60 degrees. Any number of orientations (e.g., angles) may be used in some embodiments.

Figures 3A, 3B:
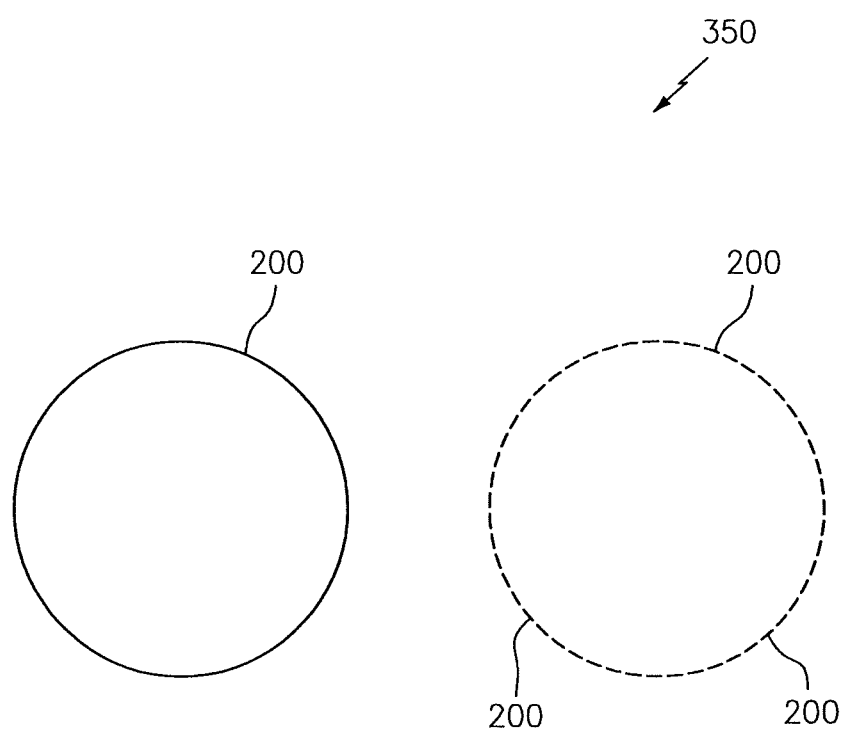
FIG. 3A illustrates a seal arranged as a continuous structure in accordance with aspects of this disclosure.
FIG. 3B illustrates a number of the seals arranged as a split-ring in forming a sealing structure in accordance with aspects of this disclosure.

The seal 200 may be manufactured as a continuous structure (see FIG. 3A). In such cases the overall shape of the seal may be a circle, an ellipse, or may feature flat sides with full radius ends. In some embodiments, the seal 200 may be manufactured as a split-ring structure where the seal 200 may be configured to be incorporated as part of a hoop or ring. For example, referring to FIG. 3B multiple seals 200 may be used to form a larger sealing structure 350.

Figure 4:
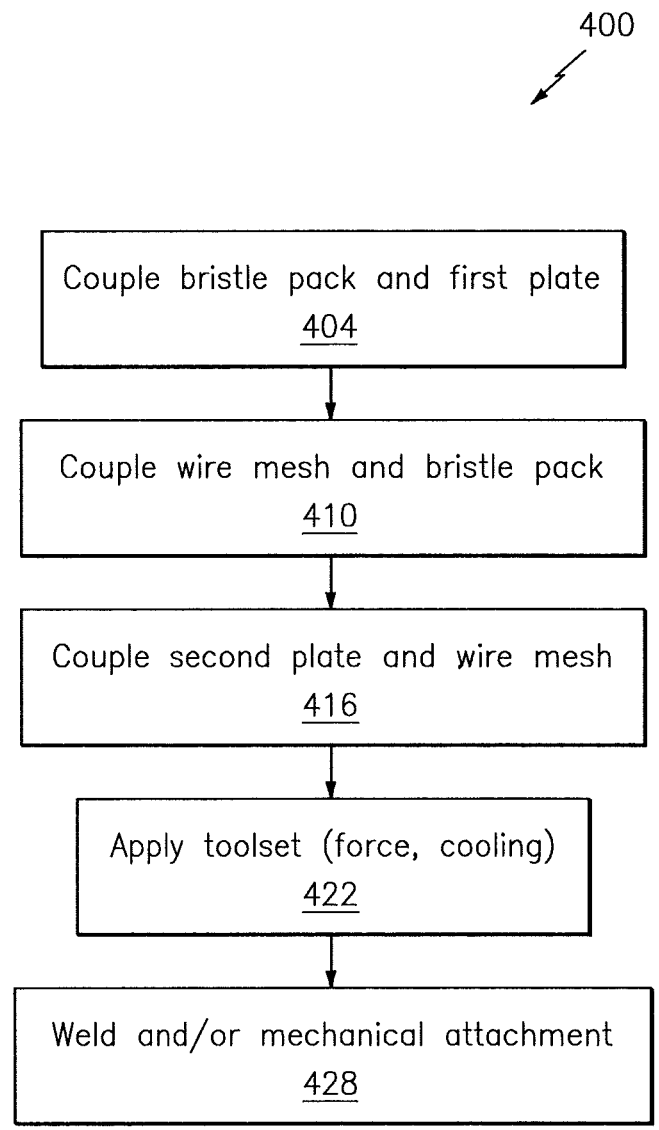
FIG. 4 illustrates a method for manufacturing a seal in accordance with aspects of this disclosure.

Referring to FIG. 4, a flowchart of a method 400 is shown. The method 400 may be used to fabricate/manufacture a seal. The method 400 is described in the context of the seal 200, but it is understood that the method 400 may be adapted to accommodate other seals.

In block 404, a bristle pack (e.g., bristle pack 218) may be coupled to a first plate (e.g., plate 212). For example, as part of block 404 the bristle pack may be positioned adjacent to the first plate as shown in FIG. 2A.

In block 410, a wire mesh (e.g., wire mesh 252) may be coupled to the bristle pack. For example, as part of block 410 the wire mesh may be positioned adjacent to the bristle pack as shown in FIG. 2A.

In block 416, a second plate (e.g., plate 202) may be coupled to the wire mesh. For example, as part of block 416 the second plate may be positioned adjacent to the wire mesh as shown in FIG. 2A.

Figure 5:
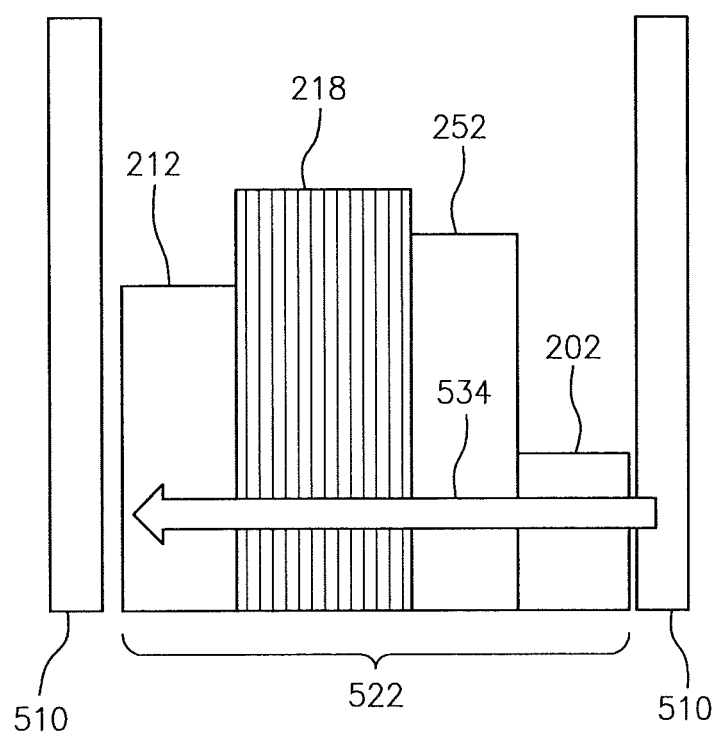
FIG. 5 illustrates an application of a toolset to form a seal in accordance with aspects of this disclosure.

In block 422, a toolset (illustrated schematically via reference character 510 in FIG. 5) may be applied to the stack-up/coupling of layers obtained in blocks 404-416 as described above. The toolset 510 may be used to hold the layers 202, 252, 218, and 212 together or in a positional relationship/stack-up relative to one another, for example based on an application of force to the layers 202, 252, 218, and 212. Still further, the toolset 510 may cool one or more of the plate 202, the wire mesh 252, the bristle pack 218, or the plate 212. While the application of the toolset 510 is referred to in a separate block 422 in FIG. 4, in accordance with aspects of the disclosure the toolset 510 may be applied as part of one or more of the blocks 404-416.

In block 428, a welding operation may occur along an end/surface 522 of the stack-up of the plate 202, 252, 218, and 212. For ease of manufacture, the end/surface 522 may be substantially smooth/contiguous with respect to the stack-up of the layers 202, 252, 218, and 212. In some embodiments, a welding operation may project through one or more of the layers 202, 252, 218, and 212 as denoted via arrow/reference character 534. The operation of block 428 may include electron beam (EB) welding or laser welding. Moreover, the operation of block 428 may include attachment/securing of the wire mesh via mechanical techniques (e.g., crimping). While shown as a separate block, the operation of block 428 may be performed in conjunction with the application of the toolset in block 422 in some embodiments.

Figure 6:
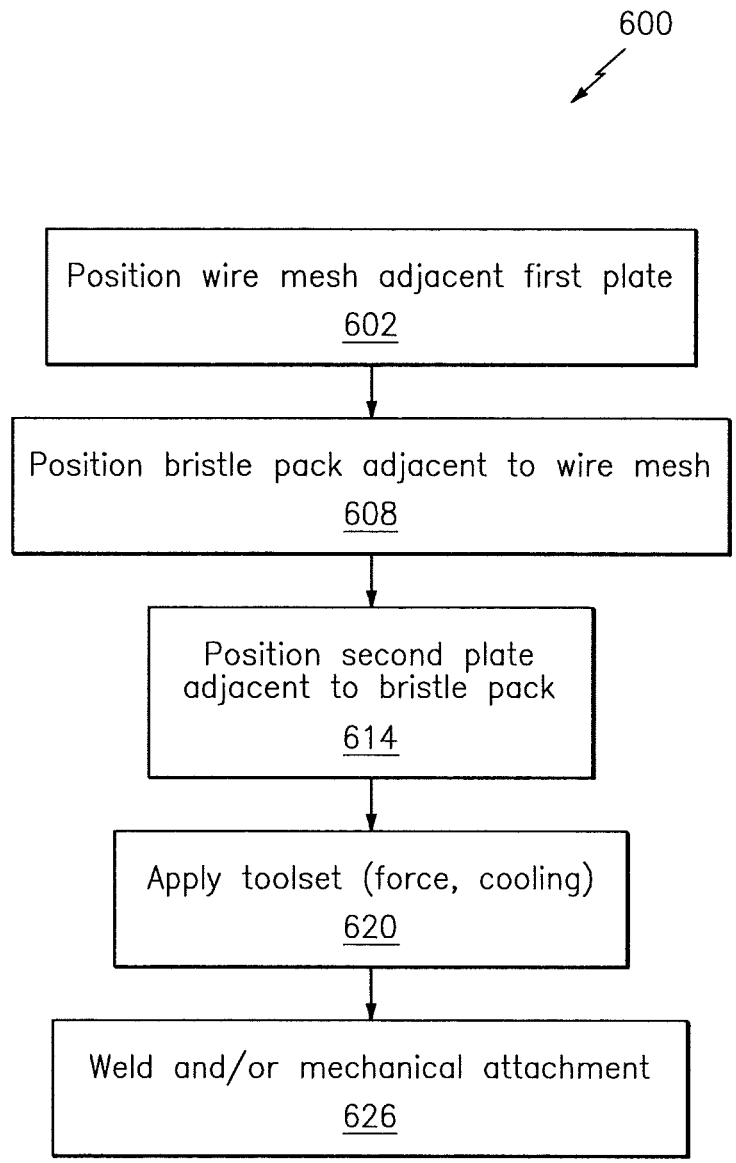
FIG. 6 illustrates a method for manufacturing a seal in accordance with aspects of this disclosure.

FIG. 6 illustrates a flowchart of a method 600 that may be used to fabricate/manufacture a seal. The method 600 is described in the context of the seal 200, but it is understood that the method 600 may be adapted to accommodate other seals.

In block 602, a wire mesh (e.g., wire mesh 252) may be positioned adjacent to a first plate (e.g., plate 202).

In block 608, a bristle pack (e.g., bristle pack 218) may be positioned adjacent to the wire mesh.

In block 614, a second plate (e.g., plate 212) may be positioned adjacent to the bristle pack.

In block 620, a toolset (toolset 510 of FIG. 5) may be applied to hold the first plate, the wire mesh, the bristle pack, and the second plate in a stack-up. Application of the toolset 620 may provide similar features/functionality as described above in connection with block 422.

In block 626, an operation may be performed to form a brush seal. The operation of block 626 may include welding and/or mechanical attachment techniques similar to what is described above in connection with block 428.

The blocks of the methods 400 and 600 are illustrative. In some embodiments the blocks/operations may occur in an order/sequence that is different from what is shown in FIG. 4 or FIG. 6. In some embodiments, additional blocks/operations not shown may be included. At least some of the blocks/operations of the methods 400 and 600 may be combined in some embodiments.

Technical effects and benefits of this disclosure include a seal that may be incorporated as part of one or more sections of an engine. Relative to a conventional seal, a seal in accordance with this disclosure may include a windage cover that facilitates ease in the manufacture of the seal. Furthermore, aspects of the disclosure provide a light weight seal while increasing the reliability of the seal in terms of use/deployment by preserving the structural integrity of the seal (e.g., the bristle pack).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method for forming a brush seal, comprising:
   positioning a wire mesh adjacent to a first plate;
   positioning a bristle pack adjacent to the wire mesh;
   positioning a second plate adjacent to the bristle pack;
   applying a toolset to hold the first plate, the wire mesh, the bristle pack, and the second plate in a stack-up; and
   performing an operation to form the brush seal from the stack-up of the first plate, the wire mesh, the bristle pack, and the second plate;
   wherein the first plate has a first plate length, the second plate has a second plate length, and the wire mesh has a wire mesh length that is greater than at least one of the first plate length or the second plate length.

2. The method of claim 1, wherein the operation includes electron beam welding.

3. The method of claim 1, wherein the operation includes a welding that projects through at least one of the first plate, the wire mesh, the bristle pack, and the second plate.

4. The method of claim 1, wherein the operation includes a welding that is performed along an end of the stack-up.

5. The method of claim 4, wherein the end is substantially contiguous in relation to the first plate, the wire mesh, the bristle pack, and the second plate.

6. The method of claim 1, wherein the operation is performed in conjunction with the application of the toolset.

7. The method of claim 1, wherein the operation includes laser welding.

8. The method of claim 1, wherein the operation includes application of a mechanical attachment technique.

9. The method of claim 8, wherein the mechanical attachment technique includes crimping.

10. The method of claim 1, wherein the bristle pack has a bristle pack length that is greater than the wire mesh length.

11. The method of claim 1, wherein the wire mesh length is greater than the first plate length and the second plate length.

12. A method for forming a brush seal, comprising:
positioning a wire mesh adjacent to a first plate;
positioning a bristle pack adjacent to the wire mesh;
positioning a second plate adjacent to the bristle pack;
applying a toolset to hold the first plate, the wire mesh, the bristle pack, and the second plate in a stack-up; and
performing an operation to form the brush seal from the stack-up of the first plate, the wire mesh, the bristle pack, and the second plate;
wherein the first plate has and extends longitudinally to a first plate end;
where the second plate has and extends longitudinally to a second plate end; and
wherein the wire mesh has a wire mesh end, and the wire mesh extends longitudinally past the first plate end and the second plate end to the wire mesh end.

13. The method of claim 12, wherein the bristle pack has a bristle pack end, and the bristle pack extends longitudinally past the first plate end, the second plate end and the wire mesh end to the bristle pack end.

* * * * *